Dec. 8, 1970  R. W. A. SCARR  3,546,584
APPARATUS FOR ANALYZING A COMPLEX WAVEFORM CONTAINING
PITCH SYNCHRONOUS INFORMATION
Filed Nov. 17, 1967  4 Sheets-Sheet 1

Inventor
ROBERT W. A. SCARR

By Charles T. Johnson Jr.
Attorney

United States Patent Office 3,546,584
Patented Dec. 8, 1970

3,546,584
APPARATUS FOR ANALYZING A COMPLEX WAVEFORM CONTAINING PITCH SYNCHRONOUS INFORMATION
Robert Walter Alister Scarr, Stansted, England, assignor to Standard Telephone and Cables Limited, London, England
Filed Nov. 17, 1967, Ser. No. 684,903
Claims priority, application Great Britain, Nov. 30, 1966, 53,636/66
Int. Cl. G01r *23/16;* G101 *1/04*
U.S. Cl. 324—77                                4 Claims

ABSTRACT OF THE DISCLOSURE

Apparatus is provided for analyzing a complex waveform containing pitch synchronous information including means for detecting a first occurrence of a selected pitch synchronous characteristic of the waveform, means for detecting a second occurrence of the characteristic, and means for measuring and recording or displaying the time elapsed between the first and second occurrences of the characteristic.

---

This invention relates to apparatus for analyzing complex waveforms containing pitch synchronous information, such as speech waveforms.

A steady state waveform, even a complex one, lends itself to mathematical treatment. For example, the performance of the vocal tract for a steady state vowel sound can be expressed in precise mathematical terms. In particular, the behavior of a single resonance, or formant, can be expressed in a relatively simple manner. The exciting source, the larynx, vibrates at a fairly consatnt frequency and produces harmonics. These harmonics are arbitrarily related to the formant frequency and, depending on the difference between the formant frequency and the nearest harmonic, a different wave shape and zero crossing pattern will result for what is presumably heard as having the same vowel quality. If the harmonic series representing the larynx source can also be expressed in mathematical terms, then it is a relatively simple, if somewhat laborious, matter to calculate the zero crossing pattern.

Conventional instruments for spectral analysis depend largely on having a repetitive waveform giving a frequency-line structure. The mathematical basis for this is the Fourier series. For single events a Fourier integral transform is a useful tool (though the Laplace transform is often preferred) and an event can be transformed from the time domain to the frequency domain and vice-versa. The Fourier integral transform and the Laplace transform are useful in going from the frequency domain to the time domain in order to obtain, for example, the transient response of a specified circuit. Frequency analysis of single events in the time domain on the other hand is not always easy to instrument or useful when done.

Speech falls between the single event and the repetitive waveform. Voiced speech may be regarded as quasi-repetitive. In continuous speech where as much, or more, information is conveyed by formant transitions as by the steady state value of the formants, it is obviously important to have a good dynamic measure of vowel quality.

Assuming a Sona-graph type of presentation is accurate, formant transitions last for periods of the 40–100 msec. order and can involve frequency changes of the second formant in excess of 1000 c./s. (P. S. Green "Consonant-Vowel Transistors, a Spectrographic Study," Audia Linguistica 12, (1958) pp. 57–105). $dF/dt$ can therefore exceed 10,000 c./s. per sec. sec. Or to put it another way, the resonant frequency of the 2nd formant can change by 100 c./s. in one (male) voicing cycle.

The basic problem is to take a source (the larynx) assumed to be constant in frequency and with a known harmonic structure and to compute either the frequency spectrum or time output as a function of the moving resonant frequencies of the vocal tract. Each harmonic can be treated separately and the results summed.

If the discrete harmonic structure of the larynx vibration can be neglected, then a formant transition will appear to the recipient as a frequency modulated wave with an "instantaneous frequency" related to the resonant frequency of the formant. "Instantaneous frequency" is a contradiction in terms because frequency cannot be measured in an instant. Nevertheless, in the theory of frequency modulation (S. Goldman "Frequency Analysis, Modulator and Noise," McGraw-Hill (1948), pp. 146–154) a useful definition of instantaneous frequency can be given when the carrier frequency is high compared with the modulation frequency. In the present case this is not necessarily true because the ratio of the fundamental of the carrier to the modulation frequency can be as low as 10 to 1. But the ratio of the formant frequency to the modulation frequency is higher and it will be assumed that the usual definition of instantaneous frequency is still useful, i.e.

$$\text{Instantaneous frequency} = \frac{1}{2\pi}\frac{d\theta}{dt}$$

where the frequency modulated signal is expressed as $$a = A \sin \theta$$

To calculate the spectrum of a frequency modulated wave is straight forward when the modulating frequency is repetitive. The result might be called the "long term spectrum" of the frequency modulated wave. However, in the case of speech, the modulating wave is not repetitive and it is the "short term" situation that is of interest. The short term situation is the best expressed by the instataneous frequency as this is presumably related closely to the actual formant resonances which are in turn related to the position of the articulators.

Thus some measure of instantaneous frequency should be less ambiguous than a presentation of the Sona-graph type which requires a justification that the peaks in the energy/frequency plot correspond to the instantaneous position of the formant and requires relatively complex instrumentation to "locate" the peaks.

According to the invention there is provided apparatus for analyzing a complex waveform containing pitch synchronous information including means for detecting a first occurrence of a selected pitch synchronous characteristic of the waveform, means for detecting a second occurrence of the characteristic, and means for measuring and recording or displaying the time elapsed between the first and second occurrences of the characteristic.

In the case of speech, a convenient measure of instantaneous frequency, as previously defined, can be obtained if the formants are separated by broad band filters and the 2nd zero crossing distance in the voicing cycle be taken as the measure. If one uses the 2nd zero crossing distance or some other measure that changes monotonically with formant frequency this should provide information that is almost as valuable as obtaining the true value of the formant frequency. In doing this the amount of zero crossing information that it is necessary to process is significantly reduced.

In a preferred embodiment of the invention therefore the apparatus includes a band pass filter through which the complex waveform is passed, a peak amplitude detector to which the filtered input is applied, a zero crossing detector to which the filtered input is applied, and means for measuring and recording or displaying the time elapsed between two successive zero crossings bearing a specific relationship to the detection of a peak amplitude in the filtered signal. In view of what has been said previously the preferred embodiment may be arranged to measure the time between the 1st and 2nd zero crossings after the detection of a peak amplitude to provide a suitable analysis of speech waveforms.

In an application of the invention several apparatus such as described above, each accepting the same complex waveform through a different band-pass filter, with their outputs applied to logic elements arranged to select and identify various combinations of the outputs, can be used in a recognition equipment. For example, by analyzing four different frequency bands it is possible to identify both the first and second formants in a speech waveform and thus assist other equipments designed to recognize other speech features such as fricative quality, sibilants, periods of silence, high frequency energy, etc., the whole forming a complete speech recognition apparatus.

In order that the above and other features of the invention may be more clearly understood and readily carried into effect, preferred embodiments will now be described with reference to the accompanying drawings, in which.

Figure 1:
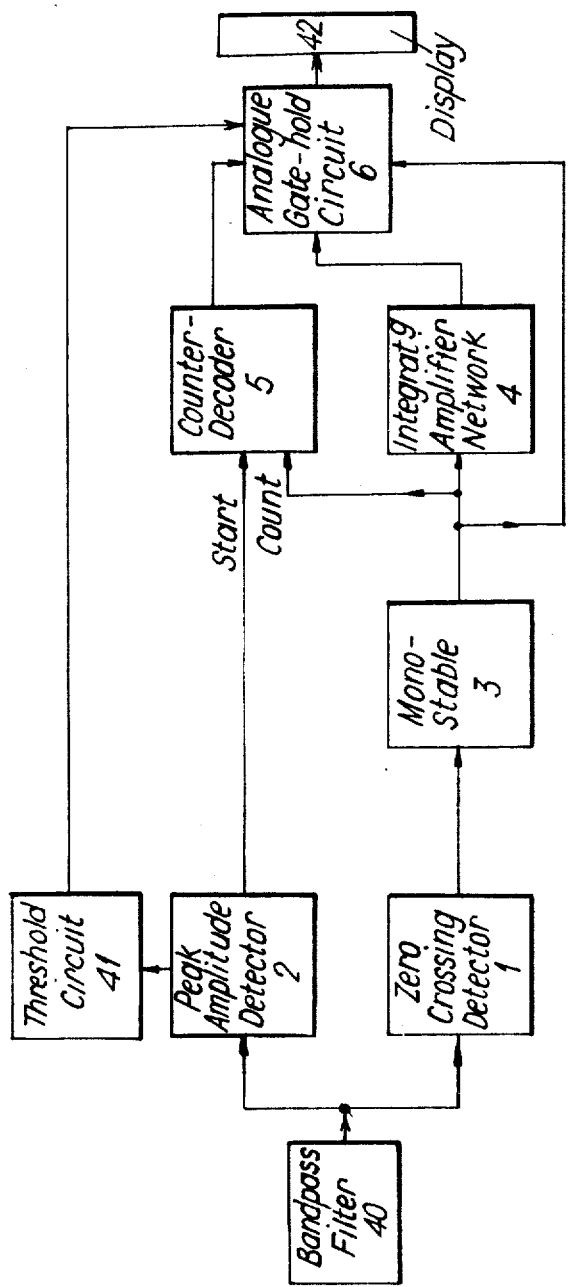
FIG. 1 is a block diagram of a circuit for detecting and measuring the time elapsed between two different but related characteristics in a complex waveform.
Figure 4:
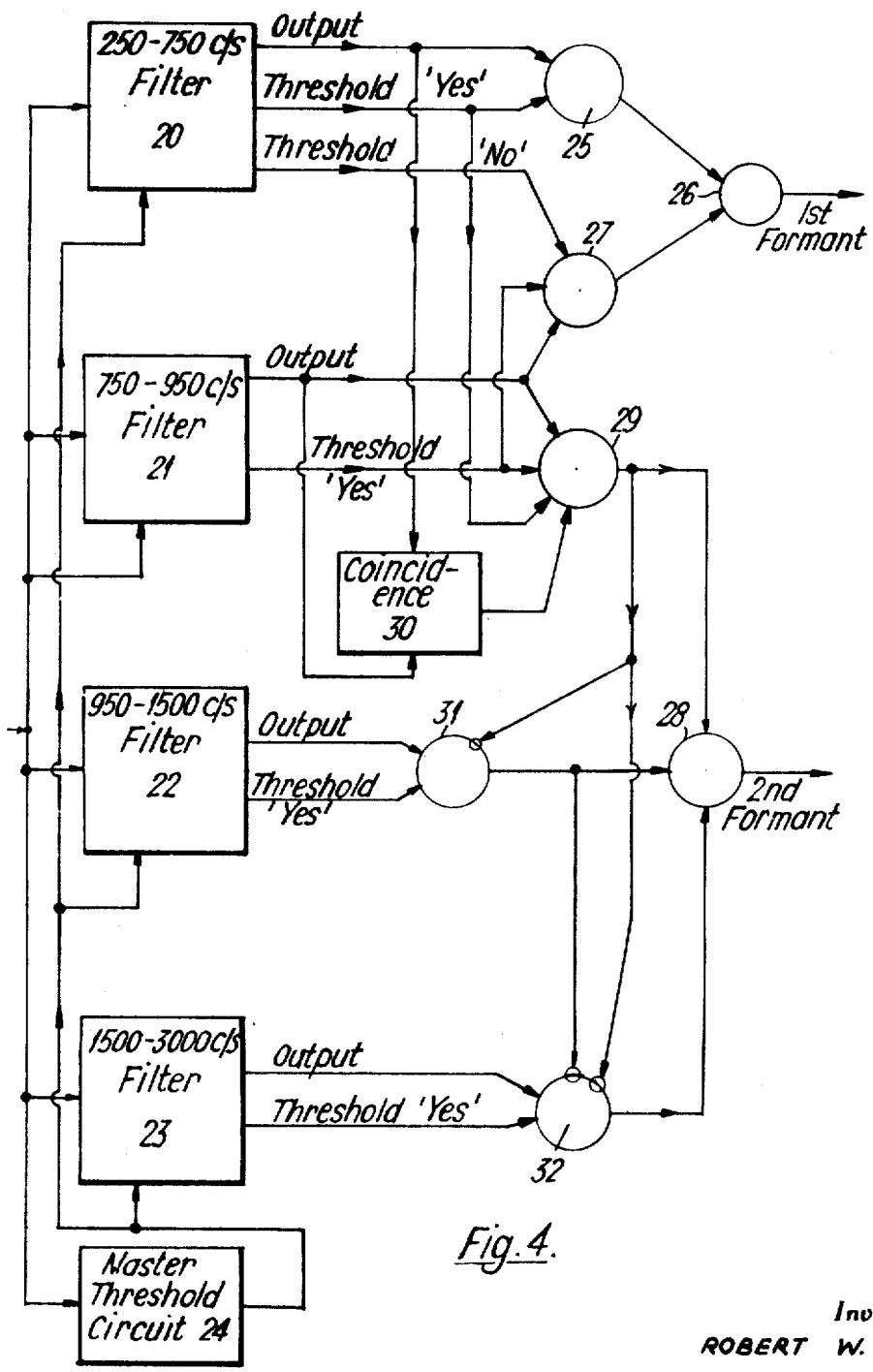

FIG. 4 is a block diagram of an arrangement for identifying the first and second formants in a speech waveform. In the arrangement of FIG. 1, the input signal is passed through a bandpass filter 40 before being applied to a zero crossing detector 1 and a peak amplitude detector 2. Every time a zero crossing occurs a monostable 3, of relatively short duration, i.e. 30 μsecs., is triggered. This pulse allows the integrating amplifier 4 to be read out and steps on a counter 5 if the latter has been started. The back edge of the pulse from the monostable 3 resets the integrating amplifier 4 to zero. The output of the integrating amplifier 4 is arranged to be proportional to the time interval between consecutive zero crossings. The counter circuit 5 is started by a triggering signal from the peak amplitude detector 2. The counter 5 is preset to give an output after a certain number of zero crossings have occurred after the detection of a peak amplitude as indicated by the peak amplitude detector. In the present case the counter output is generated after a count of two, and is then reset and stopped. The coincidence of an output from the counter 5 and a pulse from the monostable 3 is used to gate the output of the integrating amplifier into a sample and hold circuit 6 where it will remain until the next cycle occurs, or until a threshold circuit 41 detects an absence of input signal. The output of the sample and hold circuit 6 can be displayed as a trace on a cathode ray oscilloscope 42, the amplitude of which is proportional to the 2nd zero crossing distance, or inversely proportional to frequency.

If the input signal is a speech waveform it may be necessary to modify the circuit of FIG. 1 somewhat to avoid difficulties associated with speech waveforms. For example, sometimes the peaks in the waveform at the start of and within the voicing cycle will be very nearly equal in amplitude and a delay circuit can be incorporated so that only the first such peak will be effective in controlling the counter circuit. In the arrangement shown in FIG. 2 the speech waveform is passed through a band pass filter 7 before being applied to the peak amplitude detector 8. The peak amplitude detector is in effect a fullwave peak rectifier in which the current flowing during conductive peaks is amplified to produce a pulse at the output terminals. The filtered input is also applied to the zero-crossing detector 9. The latter consists of a series diode limiter, amplifier and long-tailed transistor pair. Both sides of the output from the long-tailed pair are differentiated and amplified and a positive going pulse is provided at the output when the input goes through zero in either direction.

Figure 3:
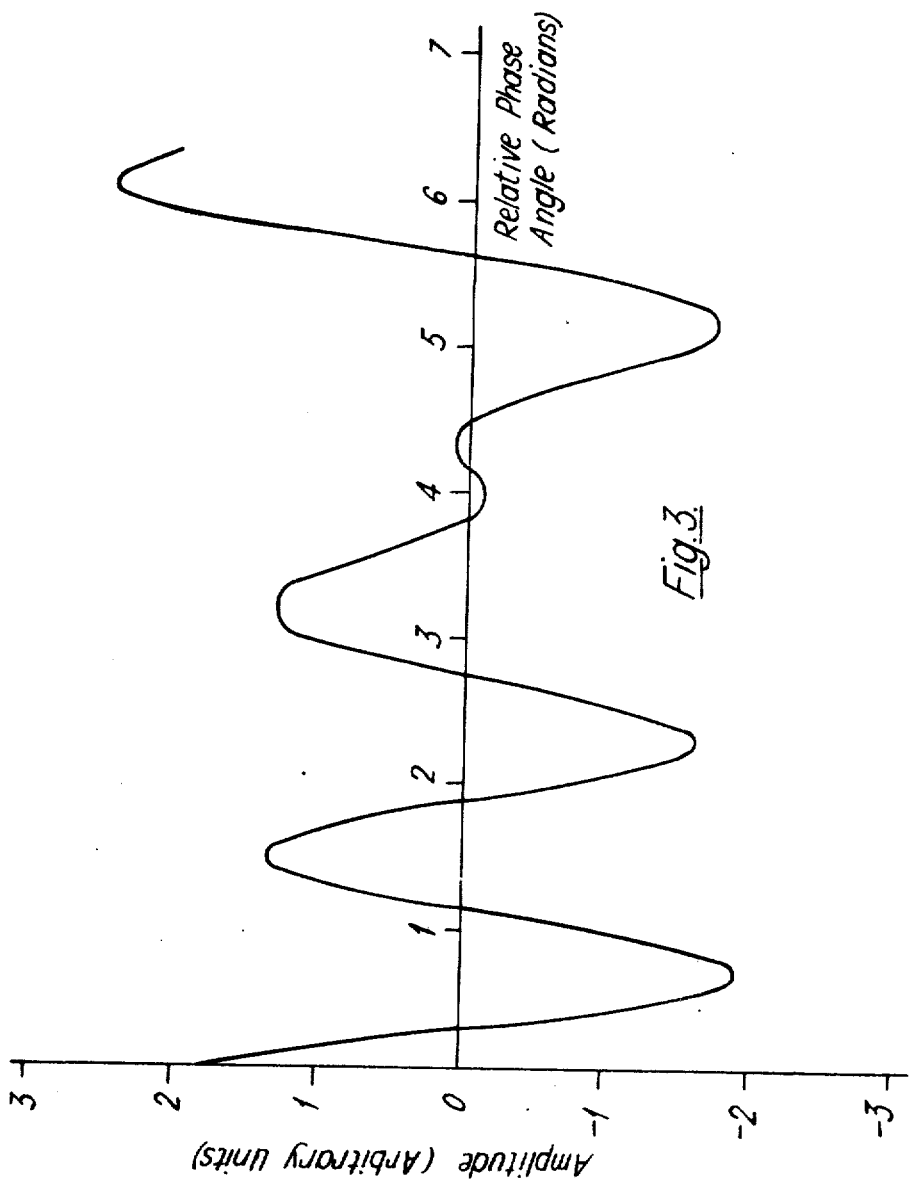
FIG. 3 illustrates a segment of a waveform.

The pulse output from the peak amplitude detector 8 is used to start, via a gate 10, the counter-decoder 11. Owing to the possibility that the rectifier may conduct several times on nearly equal peaks at the start of a voicing cycle an inhibit control is applied to the gate 10 from a delay 12 which forms a feedback circuit for the gate output. The delay is of the order of 3 msec. and is provided by a monostable which prevents output pulses from the detector 8 from reaching the counter 11 if they occur within 3 msec. of the first pulse. The first pulse from the detector 8 starts the counter-decoder 11 which counts the pulse output from a monostable 13. This monostable has a duration of 30 μsecs. and is triggered by the zero crossing detector 9. The output of the monostable 13, besides going to the counter-decoder, is applied to an integrating amplifier 14, which integrates and stores its output in the capacitor 15. The output of monostable 13 also provides one control for one sampling gate 16. The other control for gate 16 is provided by the counter-decoder 11. When a predetermined count is produced, i.e. 2, the output of the counter is decoded to generate an output pulse which, together with the second zero crossing pulse from the monostable 13, opens gate 16. Gate 16 samples the stored output on capacitor 15 and feeds the sample to the sample and hold circuit 17. At the same time the decoded output of the counter-decoder 11 is fed back to the input to provide a stop and reset control for the circuit. At the start of the next voicing cycle, or when the threshold circuit 18 indicates an absence of signal, the sample and hold circuit 17 is reset. The output from the hold circuit 17 is taken to provide a cathode ray oscilloscope 42 trace or is otherwise used as required, for example to operate logic in a recognition system. Provided the output is confined to within one formant band a linear display scale is satisfactory. FIG. 3 shows one example of the complete waveform for a single voicing cycle at a voicing frequency of 135 c./s. It will be noticed that there is a total of eight zero crossings between the peak amplitudes of the cycle. In the embodiment described above it is suggested that the distance, i.e. the time elapsed, between the second zero crossing and the start of the cycle is measured.

Figure 2:
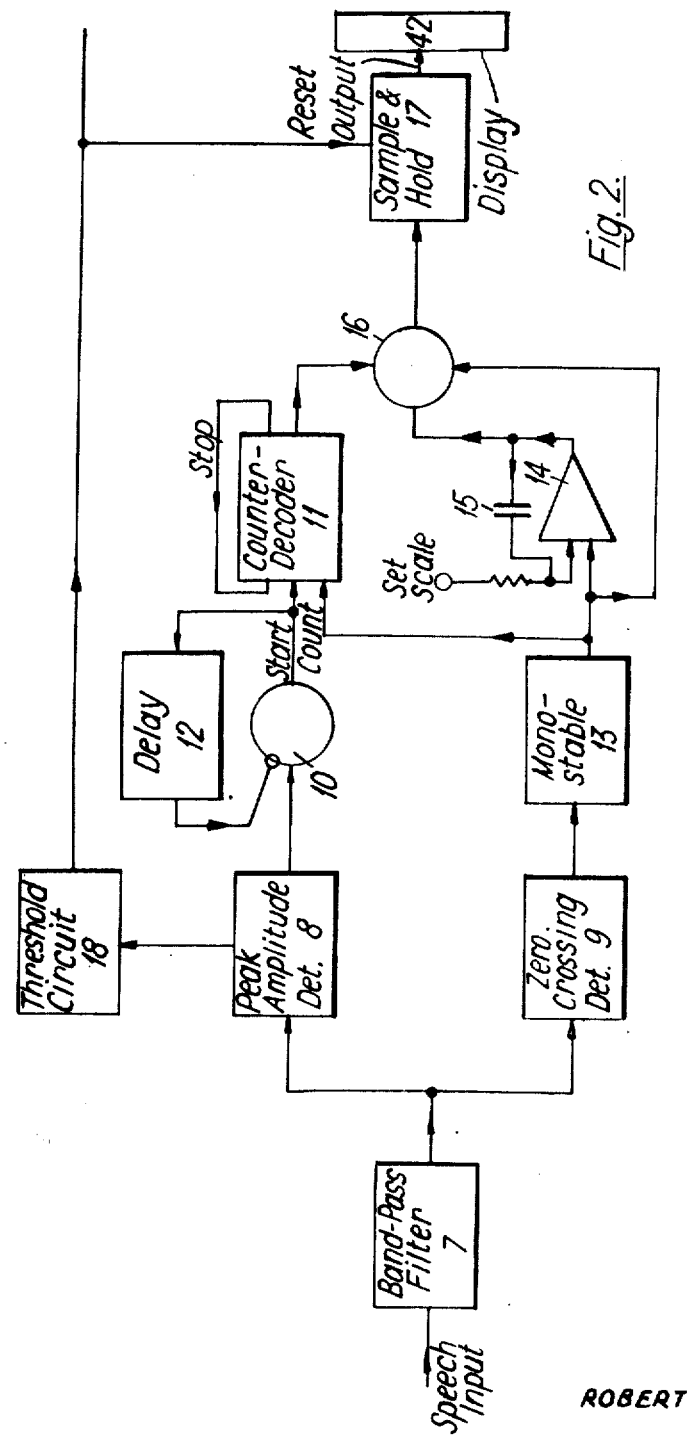
FIG. 2 is a block diagram of a modified circuit FIG. 1, adapted to measure the time elapsed between a peak amplitude and succeeding the 2nd zero crossing in a frequency band extracted from a speech waveform.

FIG. 4 shows an arrangement using four circuits 20, 21, 22, 23 each of which is similar to that of FIG. 2, to identify the first and second formants. The speech input is applied to the circuits 20–23 and to a master threshold circuit 24.

It is assumed that only the first formant lies in the frequency band 250–750 c./s. and circuit 20 includes a bandpass filter for this range. The second formant is assumed to lie in the region 950–1500 c./s. and circuit 22 has its bandpass filter covering this range. Circuit 21 covers the range 750–950 c./s. which is considered as an overlap region between the first and second formants. Circuit 23 covers another overlap region between the first and second formants, and its range is 1500–3000 c./s.

The output of any circuits 20–23 is ignored unless it exceeds a predetermined threshold. These thresholds are fixed relative to one another and not absolutely. The master threshold circuit 24 operating on the unfiltered signal determines the absolute threshold level and adjusts the thresholds of circuits 20–23 accordingly.

Circuit 20 produces three outputs, one of which is the zero crossing measurement, the other two signifying whether or not the threshold has been exceeded. The zero crossing measurement, together with the threshold "Yes" output, goes to gate 25. If both these outputs are present gate 25 opens and passes a signal to gate 26 which indicates the presence of the first formant. If circuit 20 does not exceed the required threshold level gate 25 will not open but the threshold "No" output then, in conjunction with the zero crossing measurement and threshold "Yes" outputs from circuit 21, opens gate 27. If gate 27 opens then again gate 26 is fed with a signal indicating the presence of the first formant. In other words, when an output is available from circuit 20 it appears at the first formant terminal 26. When an output is available from circuit 21 and none is available from circuit 20, the output from circuit 21 appears at the first formant terminal 26. When the outputs of circuits 20 and 21 are similar (pointing to a first formant in the region of 750 c./s.) the output of circuit 21 is suppressed. Similarly, the logic is arranged so that when circuits 20 and 21 give different outputs, the output circuit 21 goes to the second formant terminal 28 via gate 29. Gate 29 is not only responsive to the threshold "Yes" signals from circuits 20 and 21 and the zero crossing measurement from circuit 21, it is also responsive to signal from the coincidence detector 30 signifying a difference between the zero crossing measurements of circuits 20 and 21.

If circuit 21 gives an output via gate 29, indicating a second formant, it also provides inhibit controls for gates 31 and 32 through which the outputs of circuits 22 and 23 reach the second formant terminal 28. If circuit 21 cannot give an output, then circuit 22 is able to provide an output to the second formant terminal 28, and at the same time it will inhibit at gate 32 any output from circuit 23. If both circuits 21 and 22 are unable to provide an output indicative of the presence of the second formant that circuit 23 can give the necessary output to gate 28.

It will be appreciated that it is possible to extend the number of circuits and associated logic to display the third formant if required.

It may be that when the first formant lies above 750 c./s. circuit 20 will give an output at the fundamental voicing frequency for a female speaker and the output from circuit 21 will appear wrongly at the second formant terminal 28. To avoid this it is necessary either to adjust the threshold levels or to provide additional logic in the output of circuit 20.

It is to be understood that the foregoing description of specific examples of this invention is made by way of example only and is not to be considered as a limitation on its scope.

I claim:

1. Apparatus for analyzing a complex waveform containing pitch synchronous information comprising:
    a band pass filter through which the complex waveform is passed;
    a full wave peak amplitude detector to which the filtered input is applied;
    a zero-crossing detector also coupled to receive the filtered input;
    a gate having an iput coupled from the output of said peak detector and an inhibit input coupled from its output by a delay means;
    a counter-decoder coupled to said gate, and a first pulse from said peak detector starts said counter-decoder;
    a monostable coupled to be triggered by said zero-crossing detector and coupled to a following integrating amplifying means, and said counter-decoder counts the output pulses of said monostable;
    a sampling gate coupled to the outputs of said monostable, integrating means, and counter-decoder, such that at a predetermined count the output of the counter is decoded to generate an output which, together with the output pulse from said monostable opens said sampling gate, and the output of said integrating means is coupled to a following sample and hold circuit; and
    a threshold circuit coupled between said peak detector and said sample and hold circuit to reset said sample and hold circuit.

2. The apparatus according to claim 1 including display means coupled to receive the output of said sampling and holding circuit.

3. The apparatus according to claim 2 including means coupled between the output of said counter-decoder and its input to provide stop and reset control for said counter-decoder.

4. The apparatus according to claim 2 wherein said integrating amplifier means includes an integrating amplifier and a capacitor, whereby the output from said monostable is applied to said amplifier which integrates and stores its output in said capacitor.

References Cited

UNITED STATES PATENTS

| | | | |
|---|---|---|---|
| 3,296,374 | 1/1967 | Clapper | 179—1 |
| 3,450,989 | 6/1969 | Dickinson | 179—1 |
| 3,335,225 | 8/1967 | Campanella et al. | 179—1 |
| 3,381,093 | 4/1968 | Flanagan | 179—15.55 |
| 3,387,090 | 6/1968 | Bridges | 179—1 |
| 3,416,080 | 12/1968 | Wright et al. | 179—1 |

WILLIAM C. COOPER, Primary Examiner

J. B. LEAHEEY, Assistant Examiner

U.S. Cl. X.R.

179—1